(12) United States Patent
Szor (10) Patent No.: US 7,228,563 B2
(45) Date of Patent: Jun. 5, 2007

(54) SHELL CODE BLOCKING SYSTEM AND METHOD

(75) Inventor: Peter Szor, Northridge, CA (US)

(73) Assignee: Symantec Corporation, Cupertino, CA (US)

( * ) Notice: Subject to any disclaimer, the term of this patent is extended or adjusted under 35 U.S.C. 154(b) by 784 days.

(21) Appl. No.: 10/360,341

(22) Filed: Feb. 6, 2003

(65) Prior Publication Data

US 2004/0158729 A1  Aug. 12, 2004

(51) Int. Cl.
*H04L 9/00* (2006.01)

(52) U.S. Cl. .......................... 726/22; 726/23; 726/24; 726/25; 713/164; 713/188; 713/190; 709/216; 709/217

(58) Field of Classification Search ...................... None
See application file for complete search history.

(56) References Cited

U.S. PATENT DOCUMENTS

| | | | | |
|---|---|---|---|---|
| 5,598,531 A | * | 1/1997 | Hill .............................. | 726/24 |
| 5,696,822 A | | 12/1997 | Nachenberg ................... | 380/4 |
| 5,802,178 A | * | 9/1998 | Holden et al. .............. | 713/151 |
| 5,822,517 A | | 10/1998 | Dotan ........................ | 395/186 |
| 6,301,699 B1 | | 10/2001 | Hollander et al. ............. | 717/4 |
| 6,357,008 B1 | | 3/2002 | Nachenberg ................ | 713/200 |
| 6,910,142 B2 | * | 6/2005 | Cross et al. ................. | 713/324 |

OTHER PUBLICATIONS

Vasudevan, A., et al, 'SPiKE: Engineering Malware Analysis Tools using Unobtrusive Binary-Instrumentation', Austrailian Computer Society, 2006, Dept of CS & Engineering, Univ of Texas at Arlington, entire document, http://crpit.com/confpapers/CRPITV48Vasudevan.pdf.*

Szor, P., "*Attacks on WIN32*", Virus Bulletin Conference, Oct. 1998, Virus Bulletin Ltd., The Pentagon, Abingdon, Oxfordshire, England, pp. 57-84.
Szor, P., "*Memory Scanning Under Windows NT*", Virus Bulletin Conference, Sep. 1999, Virus Bulletin Ltd., The Pentagon, Abingdon, Oxfordshire, England, pp. 1-22.
Szor, P., "*Attacks on WIN32-Part II*", Virus Bulletin Conference, Sep. 2000, Virus Bulletin Ltd., The Pentagon, Abingdon, Oxfordshire, England, pp. 47-68.
Chien, E. and Szor, P., "*Blended Attacks Exploits, Vulnerabilities and Buffer-Overflow Techniques In Computer Viruses*", Virus Bulletin Conference, Sep. 2002, Virus Bulletin Ltd., The Pentagon, Abingdon, Oxfordshire, England, pp. 1-36.
Buysse, J., "*Virtual Memory: Window NT® Implementation*", pp. 1-15 [online]. Retrieved on Apr. 16, 2003. Retrieved from the Internet:<URL:http://people.msoe.edu/~barnicks/courses/cs384/papers19992000/buyssej-Term.pdf>.
Dabak, P., Borate, M. and Phadke, S., "*Hooking Windows NT System Services*", pp. 1-8 [online]. Retrieved on Apr. 16, 2003. Retrieved from the Internet:<URL:http://www.windowsitlibrary.com/Content/356/06/2.html>.
"*How Entercept Protects: System Call Interception*", pp. 1-2 [online]. Retrieved on Apr. 16, 2003. Retrieved from the Internet:<URL:http://www.entercept.com/products/technology/kernelmode.asp>. No author provided.

(Continued)

*Primary Examiner*—Nasser Moazzami
*Assistant Examiner*—Ronald Baum
(74) *Attorney, Agent, or Firm*—Gunnison, McKay & Hodgson, L.L.P.; Serge J. Hodgson (57) ABSTRACT

A method includes hooking a critical operating system function, originating a call to the critical operating system function with a call module of a parent application, stalling the call, determining a location of the call module in memory, and determining whether the location is in an executable area of the memory. Upon a determination that the call module is not in the executable area, the method further includes terminating the call. By terminating the call, execution of a child application that would otherwise allow unauthorized remote access is prevented.

30 Claims, 4 Drawing Sheets

OTHER PUBLICATIONS

"*How Entercept Protects: System Call Interception*", p. 1 [online]. Retrieved on Apr. 16, 2003. Retrieved from the Internet:<URL:http://www.entercept.com/products/technology/interception.asp>. No author provided.

Kath, R., "*The Virtual-Memory Manager in Windows NT*", pp. 1-11 [online]. Retrieved on Apr. 16, 2003. Retrieved from the Internet:<URL:http://msdn.microsoft.com/library/en-us/dngenlib/html/msdn_ntvmm.asp?frame=true>.

Szor, P. and Kaspersky, E., "*The Evolution of 32-Bit Windows Viruses*", Windows & .Net Magazine, pp. 1-4 [online]. Retrieved on Apr. 16, 2003. Retrieved from the Internet:<URL:http://www.winnetmag.com/Articles/Print.cfm?ArticleID=8773>.

Szor, P., "*The New 32-bit Medusa*", Virus Bulletin, Dec. 2000, Virus Bulletin Ltd., The Pentagon, Abingdon, Oxfordshire, England, pp. 8-10.

Szor, P., "*Shelling Out*", Virus Bulletin, Feb. 1997, Virus Bulletin Ltd., The Pentagon, Abingdon, Oxfordshire, England, pp. 6-7.

McCorkendale, B. and Szor, P., "*Code Red Buffer Overflow*", Virus Bulletin, Sep. 2001, Virus Bulletin Ltd., The Pentagon, Abingdon, Oxfordshire, England, pp. 4-5.

Nachenberg, C., "*A New Technique for Detecting Polymorphic Computer Viruses*", University of California, Los Angeles, 1995.

Szor, P., U.S. Appl. No. 10/681,623, filed Oct. 7, 2003, entitled "Unmapped Code Blocking System and Method".

Szor, P., U.S. Appl. No. 10/781,207, filed Feb. 17, 2004, entitled "Kernal Mode Overflow Attack Prevention System and Method".

"*INFO: CreateFileMapping () SEC_\* Flags*", pp. 1-2 [online]. Retrieved on Sep. 24, 2003. Retrieved from the internet: URL:http://support.microsoft.com/default.aspx?scid=http://support.microsoft.com:80/support/kb/articles/Q108/2/31.asp&NoWebContent=1. No author provided.

"*CreateFileMapping*", pp. 1-5 [online]. Retrieved on Sep. 10, 2003. Retrieved from the internet: URL:http://msdn.microsoft.com/library/en-us/fileio//base/createfilemapping.asp?frame=true. No author provided.

Szor, P., U.S. Appl. No. 10/371,945, filed Feb. 21, 2003, entitled "Safe Memory Scanning".

Szor, P., U.S. Appl. No. 10/464,091, filed Jun. 17, 2003, entitled "Send Blocking System and Method".

Szor, P., U.S. Appl. No. 10/611,472, filed Jun. 30, 2003, entitled "Signature Extraction System and Method".

\* cited by examiner

SHELL CODE BLOCKING SYSTEM AND METHOD

BACKGROUND OF THE INVENTION

1. Field of the Invention

The present invention relates to the protection of computer systems. More particularly, the present invention relates to a behavior-blocking system and method.

2. Description of the Related Art

Buffer overflow techniques have been used by malicious hackers and virus writers to attack computer systems. Buffers are data storage areas, which generally hold a predefined amount of finite data. A buffer overflow occurs when a program attempts to store data into the buffer, where the data is larger than the size of the buffer.

One category of buffer overflow, sometimes called stack-based buffer overflow, involves overwriting stack memory. Stack-based buffer overflow is typically caused by programs that do not verify the length of the data being copied into a buffer.

When the data exceeds the size of the buffer, the extra data can overflow into the adjacent memory locations. In this manner, it is possible to corrupt valid data and possibly to change the execution flow and instructions. Thus, by exploiting a buffer overflow, it is possible to inject malicious code, sometimes called shell code, into the execution flow. This shell code allows remote system level access, giving unauthorized access to not only malicious hackers, but also to replicating malware, e.g., worms.

SUMMARY OF THE INVENTION

A method includes hooking a critical operating system function, originating a call to the critical operating system function with a call module of a parent application, stalling the call, determining a location of the call module in memory, and determining whether the location is in an executable area of the memory. Upon a determination that the call module is not in the executable area, the method further includes terminating the call. By terminating the call, execution of a child application that would otherwise allow unauthorized remote access is prevented.

Embodiments in accordance with the present invention are best understood by reference to the following detailed description when read in conjunction with the accompanying drawings.

BRIEF DESCRIPTION OF THE DRAWING

Common reference numerals are used throughout the drawings and detailed description to indicate like elements.

DETAILED DESCRIPTION

Figure 3:
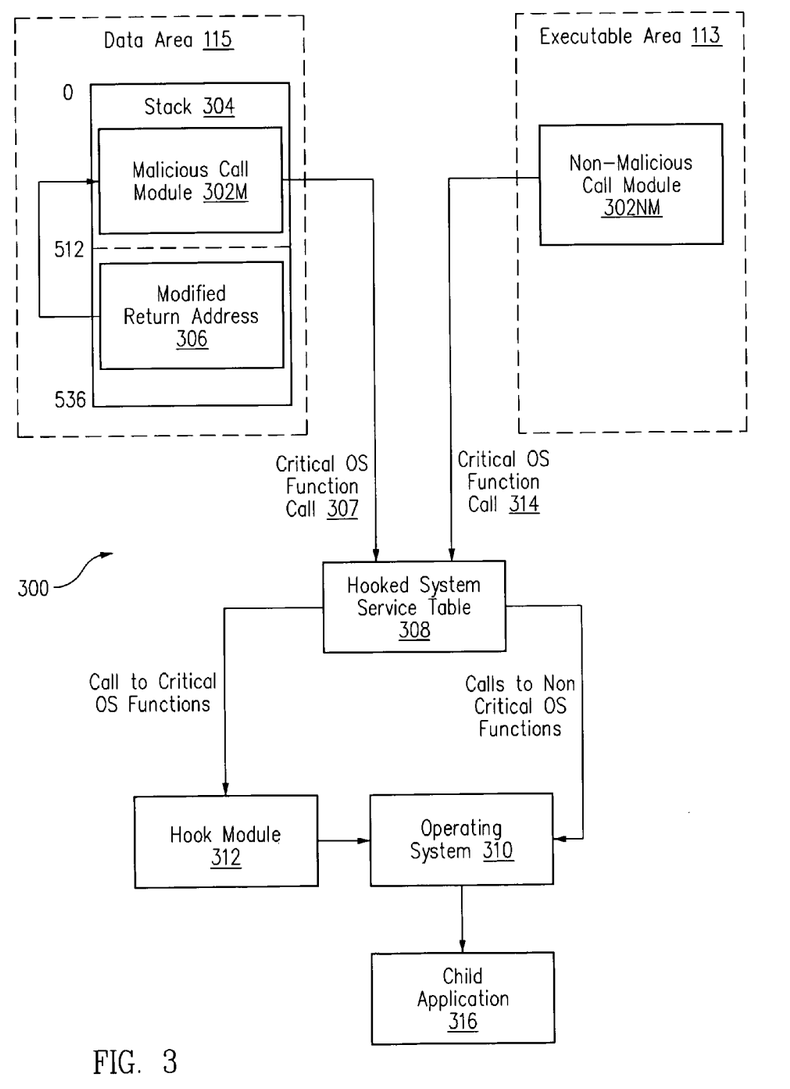
FIG. 3 is a diagram of a hooked operating system function call flow in accordance with one embodiment of the present invention.

In accordance with one embodiment, referring to FIG. 3, a method includes hooking a critical operating system function, for example, using a hooked system service table 308. The method further includes originating a critical OS function call 307 to the critical operating system function with a malicious call module 302M of a parent application. The method further includes stalling critical OS function call 307 and determining whether malicious call module 302M is in an executable area 113 of the memory. Upon a determination that malicious call module 302M is not in executable area 113, the method further includes terminating critical OS function call 307. By terminating critical OS function call 307, execution of a child application 316 that would otherwise allow unauthorized remote access is prevented.

Figure 1:
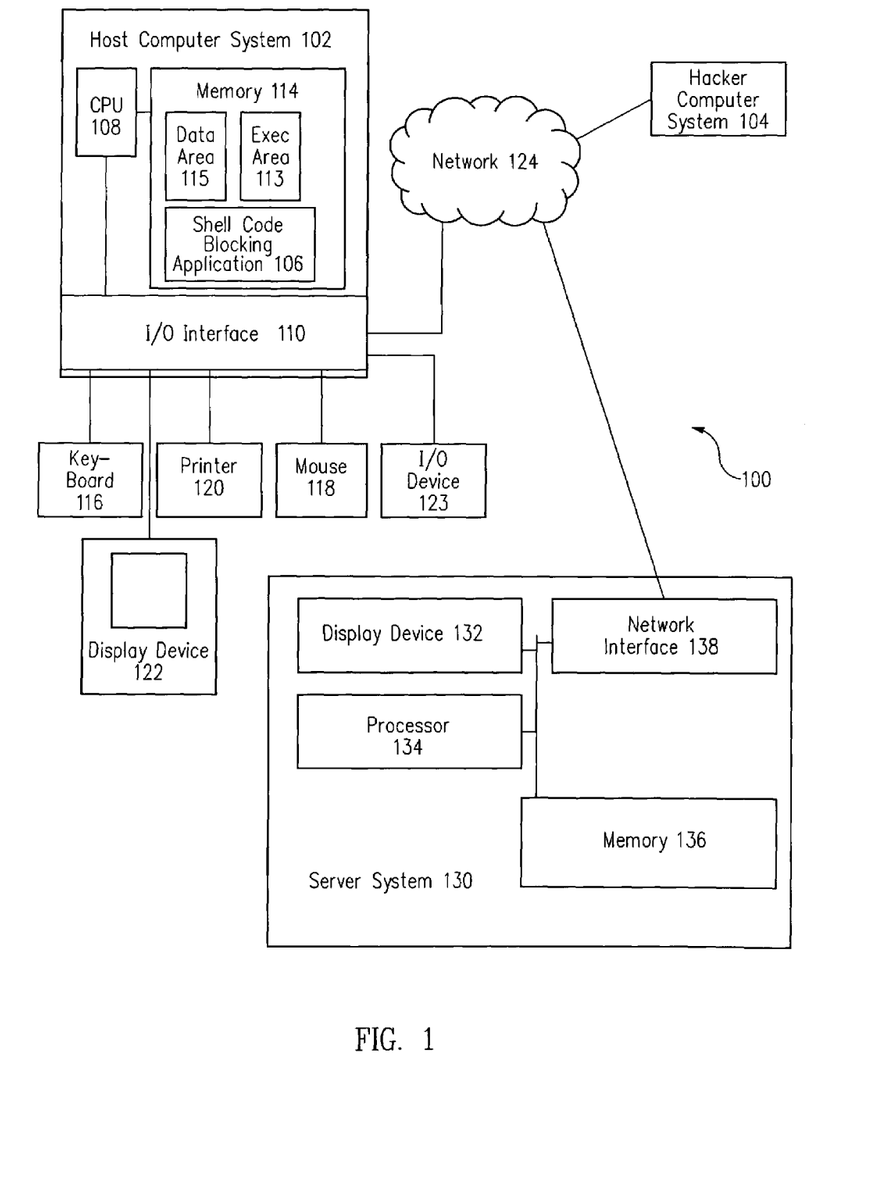
FIG. 1 is a diagram of a client-server system that includes a shell code blocking application executing on a host computer system in accordance with one embodiment of the present invention.

More particularly, FIG. 1 is a diagram of a client-server system 100 that includes a shell code blocking application 106 executing on a host computer system 102, e.g., a first computer system, in accordance with one embodiment of the present invention.

Host computer system 102, sometimes called a client or user device, typically includes a central processing unit (CPU) 108, hereinafter processor 108, an input output (I/O) interface 110, and a memory 114. Host computer system 102 may further include standard devices like a keyboard 116, a mouse 118, a printer 120, and a display device 122, as well as, one or more standard input/output (I/O) devices 123, such as a compact disk (CD) or DVD drive, floppy disk drive, or other digital or waveform port for inputting data to and outputting data from host computer system 102. In one embodiment, shell code blocking application 106 is loaded into host computer system 102 via I/O device 123, such as from a CD, DVD or floppy disk containing shell code blocking application 106.

In one embodiment, memory 114 includes an executable area 113 and a data area 115. Executable area 113 is an area of memory 114 in which executable applications are located.

In one embodiment, memory 114 includes a page based virtual memory system that uses pages, e.g., 4096 byte memory areas. These pages have individual properties such as, for example, that they are writable and/or executable. A page is writable if it is marked as writable, i.e., is marked as a page for storage of data. A page is executable if it is marked as executable, i.e., is marked as a page for storing executable content. In accordance with this embodiment, executable area 113 includes pages that are marked as executable. For example, executable area 113 includes pages that are marked as executable and writable.

In one embodiment, a set of flags describe the properties of a page. For example, these flags are maintained in the pages tables or in other operating system managed lists or databases.

In contrast, data area 115 is an area of memory 114 in which executable applications are not located, e.g., data area 115 is an area of memory 114 in which data is located. Examples of data area 115 include the stack, heap, and pages that are not marked as executable, i.e., non-executable pages.

Host computer system 102 is coupled to a server system 130 of client-server system 100 by a network 124. Server system 130 typically includes a display device 132, a processor 134, a memory 136, and a network interface 138.

Further, host computer system 102 is also coupled to a hacker computer system 104 of client-server system 100 by network 124. In one embodiment, hacker computer system 104 is similar to host computer system 102, for example, includes a central processing unit, an input output (I/O) interface, and a memory. Hacker computer system 104 may further include standard devices like a keyboard, a mouse, a printer, a display device and an I/O device(s). The various hardware components of hacker computer system 104 are not illustrated to avoid detracting from the principals of the invention.

Network 124 can be any network or network system that is of interest to a user. In various embodiments, network interface 138 and I/O interface 110 include analog modems, digital modems, or a network interface card.

Shell code blocking application 106 is stored in memory 114 of host computer system 102 and executed on host computer system 102. The particular type of and configuration of host computer system 102, hacker computer system 104, and server system 130 are not essential to this embodiment of the present invention.

Figure 2:
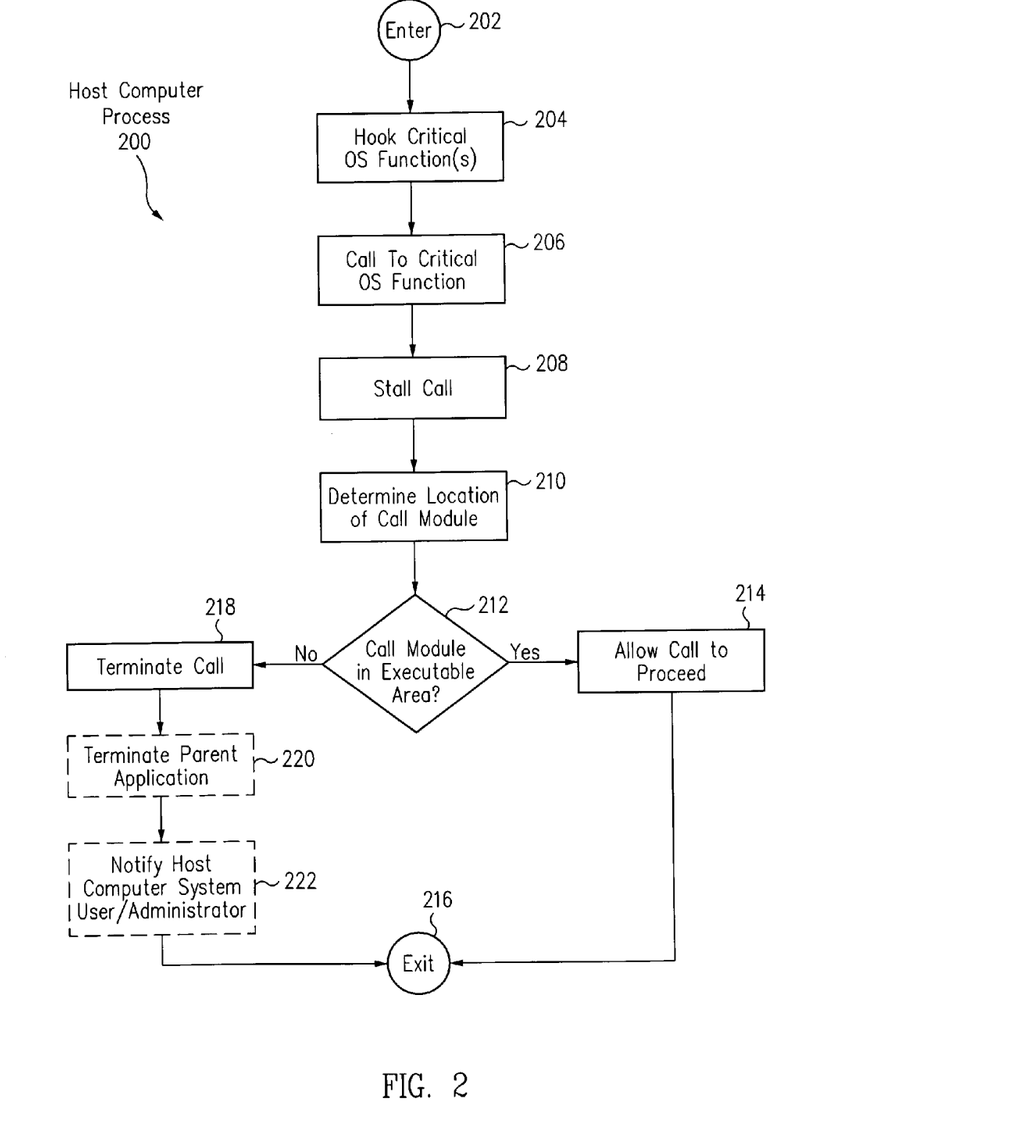
FIG. 2 is a flow diagram of a host computer process in accordance with one embodiment of the present invention.

FIG. 2 is a flow diagram of a host computer process 200 in accordance with one embodiment of the present invention. Referring now to FIGS. 1 and 2 together, execution of shell code blocking application 106 by processor 108 results in the operations of host computer process 200 as described below in one embodiment.

From an enter operation 202, flow moves to a hook critical operating system (OS) function(s) operation 204. In hook critical OS function(s) operation 204, the critical operating system functions, e.g., at least one critical operating system function, of host computer system 102 are hooked. In one embodiment, a system level, e.g. a kernel mode module or kernel mode driver, hooks the critical operating system functions. Further, in one embodiment, an operating system function is hooked by redirecting calls to the operating system function, for example, to a hook module in accordance with the present invention.

In one embodiment, an operating system function is critical if it is necessary for a first application, e.g., a parent application, to cause executed of a second application, e.g., a child application. In one particular embodiment, an operating system function is critical if it is necessary or likely to be used by a malicious parent application, e.g., an application which contains malicious code, to execute a child application, where the child application allows remote access, e.g., remote system level access. Examples of child applications include the command prompt or "cmd.exe" on a Windows® operating system and "/bin/sh" on a UNIX or UNIX like, e.g., FreeBSD or MacOS x, operating system. As used herein, a child application is not dependent upon a parent application, i.e., once the child application is executed the parent application can be terminated without termination of the child application.

As is well known to those of skill in the art, system calls expose all kernel functionality that user-mode programs require. User-mode programs need to utilize the functionality provided by the kernel, for example, to access disk drives, network connections, and shared memory. More particularly, since the processor prevents direct access to kernel mode functions by user-mode programs, user-mode programs use system calls, which form the only permitted interface between user-mode and kernel mode. In accordance with one embodiment, system calls include critical OS function calls and non-critical OS function calls.

In one embodiment, on a Windows® operating system, the ZwCreateProcess() system function and it relatives, e.g., ZwCreateProcessEx() system function, are critical OS functions. In another embodiment, on a UNIX or UNIX like operating system, execve(), execl(), execlp(), execle(), execto, execv(), and/or execvp() system functions are critical OS functions.

From hook critical OS function(s) operation 204, flow moves to a call to critical OS function operation 206. In call to critical OS function operation 206, a call, sometimes called a critical OS function call, to a critical OS function is made by a call module of a parent application. The parent application may be malicious or non-malicious. More particularly, a critical OS function call is made by a call module of a parent application to an OS function that was hooked in hook critical OS function(s) operation 204.

In accordance with one embodiment of the present invention, a call module includes the critical OS function call instruction(s), i.e., the instruction or set of instructions that originates the critical OS function call. The call module may be malicious or non-malicious. The parent application includes the call module, or, in one embodiment, the parent application is the call module.

From call to critical OS function operation 206, flow moves to a stall call operation 208. In stall call operation 208; the critical OS function call of operation 206 to the critical OS function is stalled, i.e., is prevented from reaching the operating system. By stalling the critical OS function call, execution of the critical OS function is stalled.

From stall call operation 208, flow moves to a determine location of call module operation 210. In determine location of call module operation 210, the location in memory 114 of the call module that originated the critical OS function call of operation 206 to the critical OS function is determined.

More particularly, in determine location of call module operation 210, a determination is made as to whether the call module is located in executable area 113 or data area 115 of memory 114. In one embodiment, a stack trace-back operation, e.g., a stack analyzer routine, is used to determine the location in memory 114 of the call module as discussed below with reference to FIG. 4.

From determine location of call module operation 210, flow moves to a call module in executable area check operation 212. In check operation 212, a determination is made as to whether the call module is in executable area 113 of memory 114. If a determination is made in check operation 212 that the call module is in executable area 113 of memory 114, flow moves to an allow call to proceed operation 214.

In allow call to proceed operation 214, the critical OS function call is allowed to proceed. More particularly, the critical OS function call is passed to the operating system. As discussed above, the critical OS function call was stalled in stall call operation 208. From allow call to proceed operation 214, flow moves to and exits at an exit operation 216 or waits for the next critical OS function call and returns to operation 206.

In one embodiment, since the call module that originated the critical OS function call is determined to be in executable area 113 of memory 114 in check operation 212, the likelihood that the call module is malicious code, e.g., is shell code, is minimal. In one embodiment, malicious code is defined as any computer program, module, set of modules, or code that enters a computer system without an authorized user's knowledge and/or without an authorized user's consent.

However, if a determination is made in check operation 212 that the call module is not in executable area 113 of memory 114, e.g., is in data area 115, flow moves to a terminate call operation 218.

In terminate call operation 218, the critical OS function call is terminated. More particularly, the critical OS function call is not passed to the operating system but is terminated. As discussed above, the critical OS function call was stalled in stall call operation 208.

In one embodiment, since the call module that originated the critical operation system call is determined not to be in executable area 113 of memory 114 in check operation 212, the likelihood that the call module is malicious code is significant. However, by terminating the critical OS function call in terminate call operation 218, the child application is prevented from being executed. By preventing execution of the child application, remote access is denied, thus preventing unauthorized access by malicious hackers and also by replicating malware, e.g., worms.

From terminate call operation 218, optionally, flow moves to a terminate parent application operation 220. In terminate parent application operation 220, the parent application including the call module is terminated. Termination of applications is well known to those of skill in the art and so is not discussed further for clarity of discussion.

Flow moves from terminate parent application operation 220, optionally, to a notify host computer system user/administrator operation 222. In notify host computer system user/administrator operation 222, the user of host computer system 102 and/or the administrator are notified that a call and, optionally if operation 220 is performed, a parent application, has been terminated on host computer system 102. The user and/or administrator can be notified using any one of a number of techniques, e.g., by using a pop up window, by writing to a file and/or otherwise by logging the event.

From notify host computer system user/administrator operation 222, flow moves to and exits at exit operation 216 or waits for the next critical OS function call and returns to operation 206.

FIG. 3 is a diagram of a hooked operating system function call flow 300 in accordance with one embodiment of the present invention. Referring now to FIGS. 2 and 3 together, by exploiting a buffer overflow, a malicious call module 302M containing malicious code, e.g., shell code, is loaded into a stack 304 in data area 115 and executed, e.g., because of a modified return address 306. For example, a buffer overflow is exploited from hacker computer system 104.

Exploitation of buffer overflows is well known to those of skill in the art and so is not discussed to avoid detracting from the principals of the invention. For example, in "Blended Attacks Exploits, Vulnerabilities and Buffer-Overflow Techniques in Computer Viruses," Chien, E. and Ször, P., Virus Bulletin Conference, 2002, Virus Bulletin Ltd, pp. 1-35, herein incorporated in its entirety by reference, the Applicant as co-author describes exploitation of buffer overflows.

During execution of malicious call module 302M and performance of call to critical OS function operation 206, malicious call module 302M originates a critical OS function call 307 to a critical OS function. In one embodiment, malicious call module 302M originates critical OS function call 307 by making critical OS function call 307 directly. In another embodiment, malicious call module 302M originates critical OS function call 307 by calling another function, e.g., a subroutine, which, in turn, makes critical OS function call 307.

Critical OS function call 307 is routed to a hooked system service table 308. Hooked system service table 308 routes noncritical OS function calls directly to an operating system 310. However, hooked system service table 308 routes critical OS function calls to a hook module 312, e.g., a kernel mode module or kernel mode driver.

As is well known to those of skill in the art, a system service table, sometimes called a dispatch table or a system call table, relates system calls to specific addresses within the operating system kernel. Hooked system service table 308 in accordance with one embodiment of the present invention, redirects critical OS function calls to hook module 312 and from the specific addresses within the operating system kernel to which the critical OS function calls would otherwise be directed.

In one embodiment, hook module 312 is used to stall a critical OS function call during stall call operation 208 of FIG. 2. Further, hook module 312 continues to stall the critical OS function call during determine location of call module operation 210 and call module in executable area check operation 212. Hook module 312 allows the critical OS function call to proceed to operating system 310 during allow call to proceed operation 214. Conversely, hook module 312 terminates the critical OS function call during terminate call operation 218.

In accordance with this embodiment, critical OS function call 307 is routed by hooked system service table 308 to hook module 312. Critical OS function call 307 is stalled by hook module 312 in stall call operation 208. A determination is made that the location of malicious call module 302M is in data area 115, e.g., in a non-executable page, in determine location of call module operation 210, for example, using a stack trace-back as discussed further below in reference to FIG. 4.

In call module in executable area check operation 212, a determination is made that malicious call module 302M is not in an executable area. Hook module 312 thus terminates critical OS function call 307 in terminate call operation 218. Optionally, operations 220 and 222 are performed as discussed above and flow exits at exit operation 216.

By terminating critical OS function call 307, execution of a child application 316 is prevented. This, in turn, denies remote access thus preventing unauthorized access to host computer system 102 by malicious hackers and also by replicating malware, e.g., worms.

In contrast, a non-malicious call module 302NM, e.g., which does not include malicious code, is loaded into executable area 113 and executed. During execution of non-malicious call module 302NM and performance of call to critical OS function operation 206, non-malicious call module 302NM originates a critical OS function call 314 to a critical OS function.

Critical OS function call 314 is routed to hooked system service table 308. Critical OS function call 314 is routed by hooked system service table 308 to hook module 312. Critical OS function call 314 is stalled by hook module 312 in stall call operation 208. A determination is made that the location of non-malicious call module 302NM is in executable area 113, e.g., in an executable page, in determine location of call module operation 210, for example, using a stack trace-back as discussed further below in reference to FIG. 4.

In call module in executable area check operation 212, a determination is made that non-malicious call module 302NM is in executable area 113. Hook module 312 thus allows critical OS function call 314 to proceed in allow call to proceed operation 214. Accordingly, critical OS function call 314 is routed from hook module 312 to operating system 310. Operating system 310 causes execution of a child application 316, for example, allowing authorized remote access to host computer system 102.

In one embodiment, malicious call module 302M has been injected into a parent application, sometimes called a host application. To illustrate, malicious call module 302M has been injected into Windows® explorer, which has authorization to run the command prompt or "cmd.exe", e.g., a child application. However, as discussed above, malicious call module 302M is denied access to run the command prompt even though the host application, i.e., Windows® explorer, is authorized to run the command prompt.

Although FIG. 3 describes one example of a hooked operating system function call path, in light of this disclosure, those of skill in the art will understand that other techniques can be used to hook operating system function(s). The particular technique used depends, for example, on the particular operating system.

Figure 4:
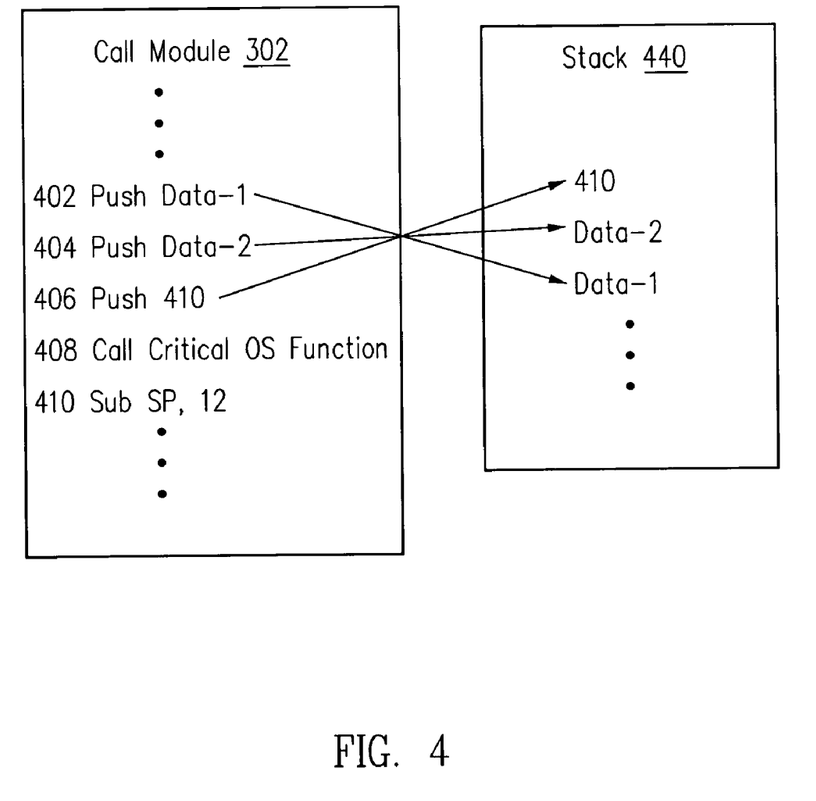
FIG. 4 is a pseudocode representation of a stack for use in determining the location of a call module in accordance with one embodiment of the present invention.

FIG. 4 is a pseudocode representation of a stack 440 used to determining the location of a call module 302 e.g., a malicious or non-malicious call module, in accordance with one embodiment of the present invention. Referring now to FIG. 4, call module 302 includes instructions 402, 404 and 406 that push Data-1, Data-2 and return pointer 410, respectively, on to stack 440. Call module 302 further includes an instruction 408 that calls a critical OS function and an instruction 410 that decrements the stack pointer for cleanup of stack 440 as those of skill in the art will understand.

Execution of instructions 402, 404 and 406 push Data-1, Data-2 and return pointer 410, respectively, on to stack 440 as shown by the arrows. Execution of instruction 408 causes a call to a critical OS function to be made. In one embodiment, call module 302 originates a call to a critical OS function during call to critical OS function operation 206 of FIG. 2 in the above manner.

In one embodiment, determine location of call module operation 210 is performed by analyzing the content of stack 440. In accordance with this embodiment, the content of stack 440 is analyzed to locate return pointer 410, which points to call module 302. More generally, return pointer 410 points to the location in memory 114 (FIG. 1) in which call module 302 is located. For example, return pointer 410 points to a location in data area 115 in the case when call module 302 contains malicious code, e.g., is shell code, or to a location in executable area 113 in the case when call module 302 is non-malicious.

Although FIG. 4 describes one example of pseudocode representation of a stack 440 used to determine the location in memory 114 of call module 302, in light of this disclosure, those of skill in the art will understand that other techniques can be used to determine the location of a call module that originated a critical OS function call. The particular technique used depends, for example, on the particular operating system.

Referring again to FIG. 1, shell code blocking application 106 is in computer memory 114. As used herein, a computer memory refers to a volatile memory, a non-volatile memory, or a combination of the two.

Although shell code blocking application 106 is referred to as an application, this is illustrative only. Shell code blocking application 106 should be capable of being called from an application or the operating system. In one embodiment, an application is generally defined to be any executable code, whether compiled or interpreted, e.g., scripts. Moreover, those of skill in the art will understand that when it is said that an application or an operation takes some action, the action is the result of executing one or more instructions by a processor. In one embodiment, shell code blocking application 106 is implemented as a system level, e.g., kernel mode driver.

While embodiments in accordance with the present invention have been described for a client-server configuration, an embodiment of the present invention may be carried out using any suitable hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, shell code blocking application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the shell code blocking functionality in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the shell code blocking functionality in accordance with one embodiment of present invention can be implemented in a wide variety of computer system configurations. In addition, the shell code blocking functionality could be stored as different modules in memories of different devices. For example, shell code blocking application 106 could initially be stored in server system 130, and then as necessary, a portion of shell code blocking application 106 could be transferred to host computer system 102 and executed on host computer system 102. Consequently, part of the shell code blocking functionality would be executed on processor 134 of server system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, shell code blocking application 106 is stored in memory 136 of server system 130. Shell code blocking application 106 is transferred over network 124 to memory 114 in host computer system 102. In this embodiment, network interface 138 and I/O interface 110 would include analog modems, digital modems, or a network interface card. If modems are used, network 124 includes a communications network, and shell code blocking application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
   stalling an operating system function call originating from a call module, said operating system function call being a call to an operating system function used to execute an application allowing remote access; and
   determining whether said call module is in an executable area of memory,
   wherein upon determining that said call module is not in said executable area, determining that said call module comprises malicious code and terminating said operating system function call; and
   wherein upon determining that said call module is in said executable area, determining that said call module is non-malicious and allowing said operating system function call to proceed.

2. The method of claim 1, wherein upon terminating said operating system function call, said method further comprising notifying a user or administrator that said operating system function call has been terminated.

3. The method of claim 1, wherein upon determining that said call module comprises malicious code, said method further comprising terminating a parent application comprising said call module.

4. The method of claim 3 further comprising notifying a user or administrator that said parent application has been terminated.

5. The method of claim 1 wherein said executable area consists of a page that is marked as executable.

6. The method of claim 1 wherein said application allowing remote access comprises the command prompt.

7. The method of claim 1 wherein said application allowing remote access comprises "cmd.exe" and said operating system function is a function of a Windows operating system.

8. The method of claim 7 wherein said operating system function comprises a ZwCreateProcess() system function.

9. The method of claim 1 wherein said application allowing remote access comprises "/bin/sh" and said operating system function is a function of a UNIX or UNIX like operating system.

10. The method of claim 9 wherein said operating system function is selected from the group consisting of execve(), execl(), execlp(), execle(), exect(), execv(), and execvp() system functions.

11. The method of claim 1 wherein said remote access is remote system level access to a host computer system.

12. A method comprising:
    hooking at least a first operating system function, said first operating system function being used to execute an application allowing remote access;
    stalling a call originating from a call module to said first operating system function;
    determining a location of said call module in memory; and
    determining whether said location is in an executable area of said memory, wherein upon a determination that said call module is not in said executable area, said method further comprising terminating said call.

13. The method of claim 12 wherein upon a determination that said call module is in said executable area, said method further comprising allowing said call to proceed.

14. The method of claim 13 wherein said call module is non-malicious.

15. The method of claim 12 wherein upon a determination that said call module is not in said executable area, said method further comprising terminating a parent application comprising said call module.

16. The method of claim 15 wherein said parent application comprises malicious code.

17. The method of claim 12 wherein said determining a location of said call module in memory comprises analyzing a content of a stack.

18. The method of claim 17 wherein said content is analyzed to locate a return pointer pointing to said call module.

19. The method of claim 12 wherein said hooking comprises redirecting calls to said first operating system function to a hook module.

20. The method of claim 19 wherein said redirecting calls is performed with a hooked system service table.

21. The method of claim 12 wherein said application allowing remote access comprises the command prompt.

22. A computer system comprising:
    a means for hooking at least a first operating system function, said first operating system function being used to execute an application allowing remote access;
    a means for stalling a call originating from a call module to said first operating system function;
    a means for determining a location of said call module in memory; and
    a means for determining whether said location is in an executable area of said memory, wherein upon a determination that said call module is not in said executable area, said method further comprising terminating said call.

23. A computer-program product comprising a computer-readable medium containing computer program code comprising:
    a shell code blocking application for determining whether a call module originating an operating system function call is in an executable area of memory, said operating system function call being a call to an operating system function used to execute an application allowing remote access,
    wherein upon determining that said call module is not in said executable area, said shell code blocking application is further for determining that said call module comprises malicious code and terminating said operating system function call; and
    wherein upon determining that said call module is in said executable area, said shell code blocking application is further for determining that said call module is non-malicious and allowing said operating system function call to proceed.

24. The computer-program product of claim 23 wherein upon terminating said operating system function call, said shell code blocking application is further for notifying a user or administrator that said operating system function call has been terminated.

25. The computer-program product of claim 23 wherein upon determining that said call module comprises malicious code, said shell code blocking application is further for terminating a parent application comprising said call module.

26. The computer-program product of claim 25 wherein said shell code blocking application is further for notifying a user or administrator that said parent application has been terminated.

27. The computer-program product of claim 23 wherein said shell code blocking application is further for stalling said operating system function call.

28. The computer-program product of claim 27 wherein said shell code blocking application is further for:

allowing said operating system function call to proceed upon determining that said call module is in said executable area.

29. The computer-program product of claim 23 wherein said executable area consists of a page that is marked as executable.

30. The computer-program product of claim 23 wherein said application allowing remote access comprises the command prompt.

* * * * *